United States Patent
Poggenburg et al.

(10) Patent No.: US 6,523,914 B2
(45) Date of Patent: Feb. 25, 2003

(54) VEHICLE STEERABILITY AND DRIVING STABILITY WHILE BRAKING IN A CURVE

(75) Inventors: Ruediger Poggenburg, Vaihingen/enz (DE); Stefan Diehle, Korntal-Muenchingen (DE); Werner Langer, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/808,272

(22) Filed: Mar. 14, 2001

(65) Prior Publication Data

US 2002/0030406 A1 Mar. 14, 2002

(30) Foreign Application Priority Data

Mar. 20, 2000 (EP) ............................................. 00105897

(51) Int. Cl.⁷ ................................................ B60T 8/60
(52) U.S. Cl. ..................................................... 303/146
(58) Field of Search ................................ 303/146, 147, 303/188; 180/197; 364/426.015, 426.016

(56) References Cited

U.S. PATENT DOCUMENTS 5,702,165 A * 12/1997 Koibuchi .................... 303/146
6,089,680 A * 7/2000 Yoshioka et al. ........... 303/140
6,125,319 A * 9/2000 Hac et al. ...................... 701/80

FOREIGN PATENT DOCUMENTS

| DE | 195 10 104 | 8/1996 |
| DE | 195 22 634 | 1/1997 |
| DE | 197 52 061 | 5/1999 |
| DE | 198 20 107 | 6/1999 |
| DE | 198 32 484 | 8/1999 |
| EP | 0 872 393 | 10/1998 |
| EP | 0 962 370 | 12/1999 |

* cited by examiner

Primary Examiner—Jack Lavinder
Assistant Examiner—C. T. Bartz
(74) Attorney, Agent, or Firm—Kenyon & Kenyon

(57) ABSTRACT

A method or apparatus for controlling a braking system in a vehicle, the vehicle including an inside front wheel and outside front wheel, whereby a determination is made of whether a drifting and/or an oversteering condition exists; and, if so, a predetermined braking pressure is applied to the outside front wheel.

12 Claims, 3 Drawing Sheets

VEHICLE STEERABILITY AND DRIVING STABILITY WHILE BRAKING IN A CURVE

The present invention relates to an apparatus and method for stabilizing a drifting or oversteered vehicle. Specifically, the present invention is directed to an improved braking system which results in better steerability and driving stability when braking in a curve.

Several methods and devices are known in the art for recognizing when and in which direction a vehicle is cornering. Furthermore, it is known to control braking of wheels individually based on wheel slip and wheel dynamics. For example, presently so-called select low principle anti-lock braking ("ABS") systems control front axle wheels of the vehicle individually and the rear axle wheels either individually or jointly. These known systems have several disadvantages in certain braking situations when the vehicle is turning.

For example, if a vehicle drifts during a turn, (i.e. the entire vehicle slides in the outward direction when the brakes are applied) usually all wheels are slipping. When drifting occurs during a braking action in a curve, at least the rear wheels and inside front wheel are likely to lock-up. The outer front wheel tends to be the least likely to lock up because the driving dynamics and weight distribution of most vehicles. In a vehicle having a known select low principle ABS system, the ABS controller responds to a drifting situation by completely removing the braking pressure from the locked wheels. When a high vehicle transverse acceleration causes maximum lateral forces at a wheel, that wheel can transmit little or no braking force to the vehicle without locking up. Thus, in most cases the braking pressure would be removed from both rear axle wheels, according to the select low control system, and the inside front wheel. In addition, the outside front wheel will have very little or no braking pressure, depending on whether the wheel is inside or outside the stability limit range. The stability limit range is a range in which the wheel has a tendency to lock. In other words, a range in which the wheel, but for a reduction in braking pressure, would lock up. To the driver in this situation, the brake pedal feels hard, yet the vehicle is not decelerating as quickly as it should.

In a vehicle that also has a chassis-related tendency to oversteer (i.e. the weight distribution is such that the rear of the vehicle tends to slide outwards during rapid cornering and braking), this tendency is reinforced even more by the lateral force provided at the front wheel on the outside of the turn.

According the physical interrelation of Kamm's circle, the less braking force a wheel must transfer, the more lateral guiding force it is able to transfer. Consequently, the vehicle follows its steering input and has a tendency to oversteer. In known systems, the ABS system reduces the braking force at the outside wheel because of the existing slip angle and the resulting tire slip. In this driving situation, however, such a reduction of braking force causes the vehicle to further destabilize. A stable vehicle performance is only achieved in this situation in response to slightly overbraking the outside front wheel.

Known vehicle dynamic control systems use expensive additional sensory technology for detecting oversteering/understeering. The additional sensory technology used in these systems generally includes an admission pressure sensor, a yaw sensor, a lateral acceleration sensor, a longitudinal-acceleration sensor, and a steering-angle sensor—all devices not generally found in a typical ABS or TCS system (antilock braking system/traction control system). Such vehicle dynamic control systems are not used in conjunction with select-low controlled ABS systems because they allow more precise determination of the physical limits. A typical ABS/TCS which has only the wheel speeds available and using the select low principle, will control the rear axle during an unstable braking condition by controlling the more unstable wheel.

The present invention relates to a method and apparatus for providing a stability measure to counteract oversteering when a vehicle is braking in a turn at a limit cornering speed or to counteract drifting when a vehicle is braking in a turn. Specifically, the invention relates to a method or apparatus for controlling a braking system in a vehicle, the vehicle including an inside front wheel and outside front wheel, wherein a determination is made of whether a drifting and/or an oversteering condition exists; and, if so, a predetermined braking pressure is applied to the outside front wheel. The turning and/or braking condition of the vehicle can be evaluated to determine whether the drifting and/or oversteering condition exists, and such a condition is determined to exist when a transverse acceleration of the vehicle exceeds a predetermined transverse acceleration value or when a difference between a velocity of the inside front wheel a velocity of the outside front wheel exceeds a first predetermined velocity difference. Also, the drifting and/or oversteering condition is determined to exist if a difference between a velocity of an inside rear wheel and a velocity of an outside rear wheel exceeds a second predetermined velocity difference or when a velocity of the outside rear wheel exceeds a velocity of each of the remaining wheels by a predetermined amount. The predetermined braking pressure is greater than a respective braking pressure on each of the remaining wheels of the vehicle and may correspond to a driver-specifiable braking pressure.

According to the present invention, the vehicle is provided with an antilock braking system that is capable of recognizing a drifting or oversteering situation when the vehicle is braking in a turn. The system can recognize a drifting or oversteering situation when the transverse acceleration of the vehicle exceeds a predetermined threshold value. The system can sense the transverse acceleration by means of a transverse acceleration sensor. Alternatively, transverse acceleration can also be calculated by known methods using the wheel speeds of the wheels. A drifting or oversteering situation can also be recognized when there is a large difference between a wheel speed of the inside rear wheel and the outside rear wheel, for example a difference of 2 to 5 km/h.

When a vehicle is drifting or oversteering, the rear wheel on the outside of the turn cuts the longest circular path, and therefore has the fastest wheel speed compared with the other wheels. Therefore, the system can also recognize a drifting or oversteering situation when the wheel speed of the outside rear wheel exceeds that of the other wheels by a predetermined threshold value, for example, 1.5 km/hr.

When the system recognizes drifting or oversteering situation, it sets a warning flag and increases the braking pressure on the outside front wheel in comparison with the braking pressure on each of the remaining wheels. The warning flag can also be used as a signal to a warning lamp, for example, to notify the driver that a drifting or oversteering situation has been recognized by the system, or that the limit speed in the curve has been reached or exceeded.

The increase in braking pressure on the outside front wheel may, advantageously, correspond to a driver-specifiable input. For example, the increase in braking pressure could correspond to the force exerted by the driver on the brake pedal.

Figure 1:
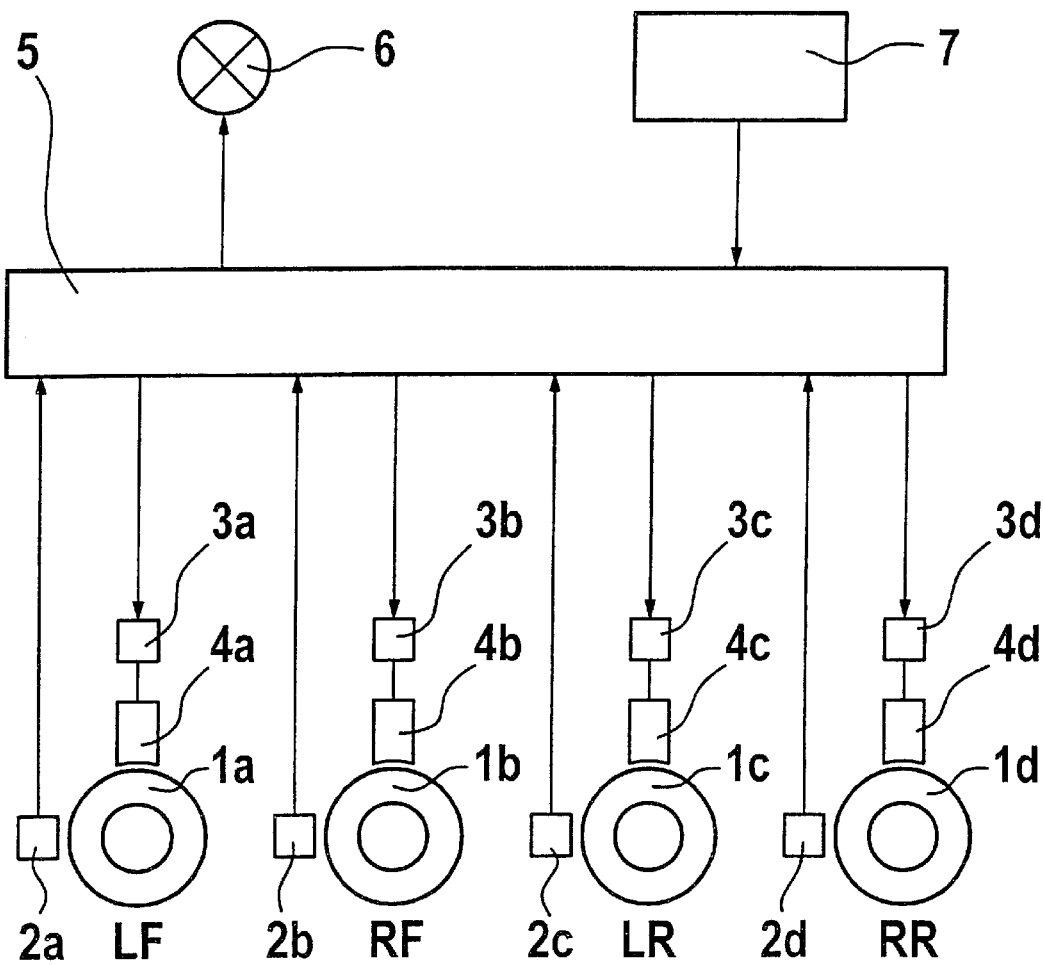
FIG. 1 is a diagram illustrating the components and their functions of a braking system according to the present invention.

FIG. 1 illustrates, in simplified form, the important components of one example of an improved antilock braking system according to the present invention. The four wheels of a vehicle, 1a–1d, are illustrated with the left front wheel identified by reference number 1a, the right front wheel by 1b, the left rear wheel by 1c and the right rear wheel by 1d. A speed sensor, 2a–2d, is provided at each wheel to measure its speed and to send a signal indicative of the wheel speed to the ABS control unit 5. The ABS controller 5, which includes a microprocessor, evaluates the signals from the speed sensors, and controls the braking pressure of each wheel individually according to an internal programming logic. Among other things, the ABS control unit 5 evaluates the signals from the speed sensors to determine whether a drifting or oversteering condition exists and, if so, controls the braking pressure of each wheel so as to stabilize the vehicle. An exemplary logic routine used by the ABS controller to improve the stability of the vehicle braking during a curve is shown in more detail in FIG. 2. The ABS controller may also receive a signal from a transverse acceleration sensor 7, which it can use to recognize a drifting or oversteering condition. To adjust the braking pressure of a wheel, the ABS control unit sends a signal to a valve 3a–3d. Depending on whether the valve opens or closes the pressure in the brake cylinder decreases or increases accordingly, thus decreasing or increasing the braking pressure on the wheels. The ABS controller can also be connected to a AS warning lamp 6 and may send a signal to the lamp when it recognizes a drifting or oversteering condition, thus relaying that fact to the driver.

It is known in the art to determine the transverse acceleration of the vehicle from the wheel speeds. A vehicle yaw rate can be determined from a difference between the wheel speeds of the right and left wheels, and the transverse acceleration can be determined in turn from the vehicle yaw rate. The roll motion for high velocities causes differences in the vertical forces acting at inner and outer wheels.

The yaw rate at the front axle is equal to the difference between the front and rear wheel speeds divided by the vehicle track breadth divided by the cosine of the steering angle of the wheel. The transverse acceleration can be obtained by multiplying the vehicle reference velocity by the yaw rate.

Figure 2:
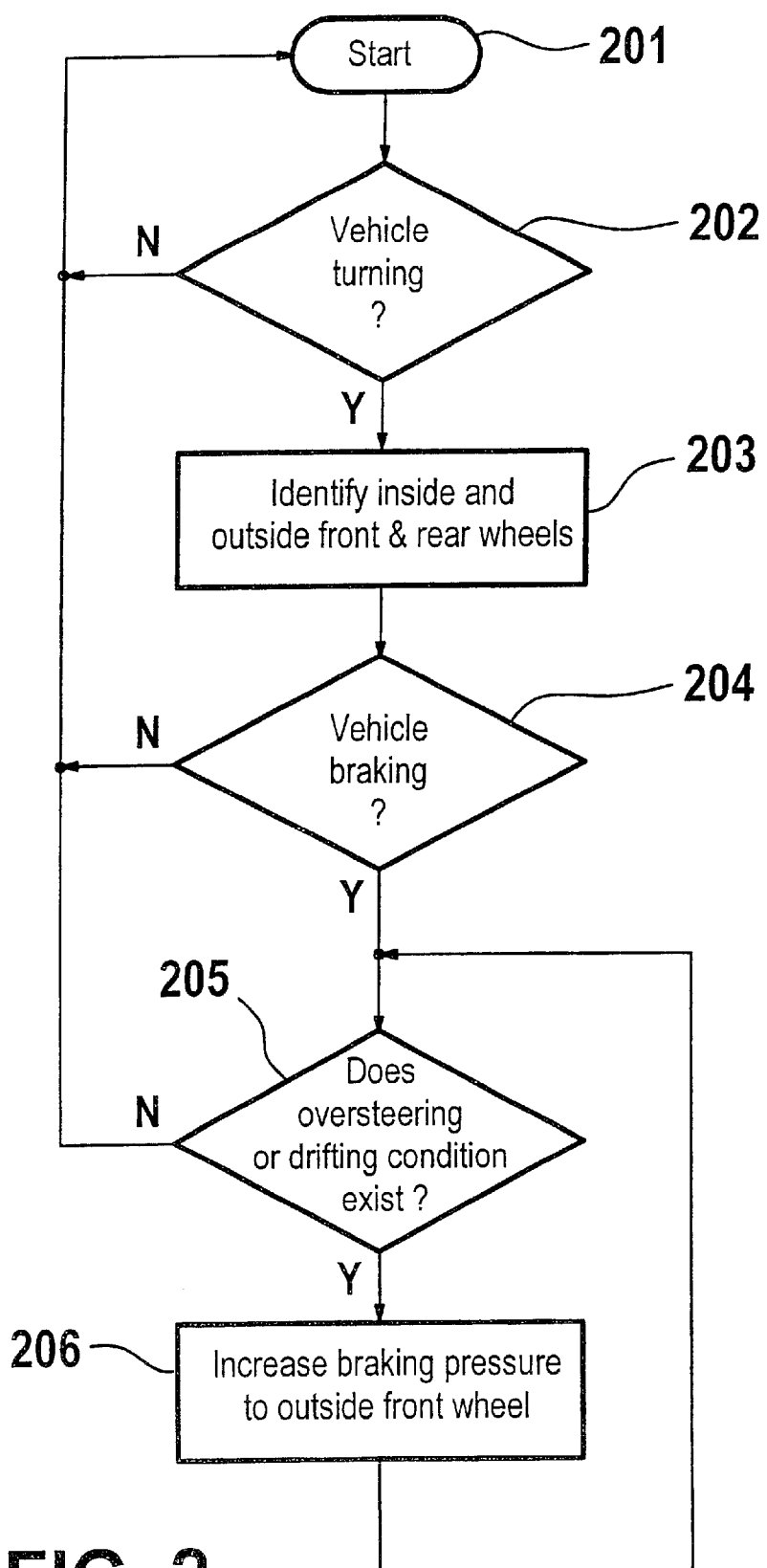
FIG. 2 is a flow chart illustrating a logic routine performed by the ABS control unit shown in FIG. 1.

FIG. 2 illustrates an example of a logic routine that can be used by the ABS control unit 5 in FIG. 1. The routine begins at step 201, after which the ABS control unit immediately determines whether the vehicle is turning in step 202. If the vehicle is in a turn, the control unit identifies, in step 203, the inside and outside front and rear wheels depending on whether the vehicle is turning left or right. In step 204, the control unit determines whether the vehicle is braking. If not, the routine begins again. Similarly, it begins again if the vehicle is not turning. If the wheel is braking, the control unit determines whether or not an oversteering or drifting condition exists. As described above, the control unit determines such a condition to exist if the transverse acceleration exceeds a predetermined threshold value, or if the difference between the wheel speeds of the inside and outside wheels exceed a predetermined threshold wheel speed difference, or if the wheel speed of the outside rear wheel exceeds the wheel speeds of the remaining wheels by a minimum predetermined wheel speed value. In any case, if an oversteering or drifting condition is found to exist, the ABS control unit performs step 206 and increases the braking pressure of the outside front wheel by a predetermined amount as compared to the braking pressure on the remaining wheels. If the drifting or oversteering condition does not exist the routine begins again at step 201. After step 206 is performed, step 205 is repeated, so that the braking pressure of the outside front wheel remains higher than that of the other wheels until the oversteering or drifting condition no longer exists.

Figure 3:
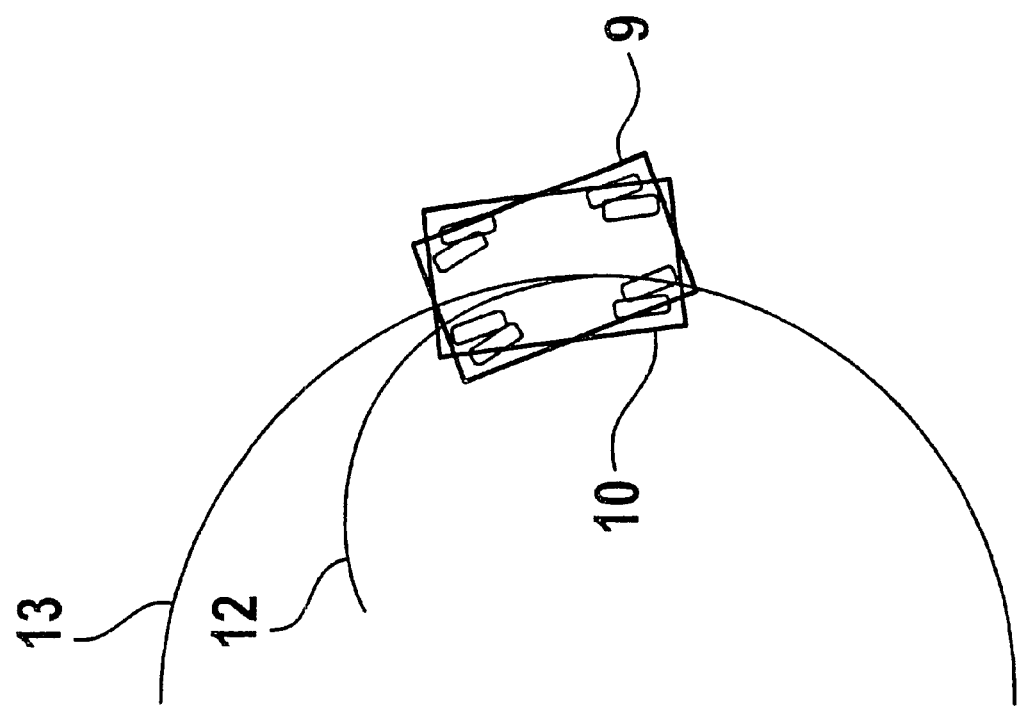
FIG. 3 is a diagram illustrating typical driving situations when braking during a curve at a vehicle velocity less than or equal to the vehicle curve limit velocity, and at a vehicle velocity exceeding the curve limit velocity with and without the improved braking system according to the present invention.
Figure 3:
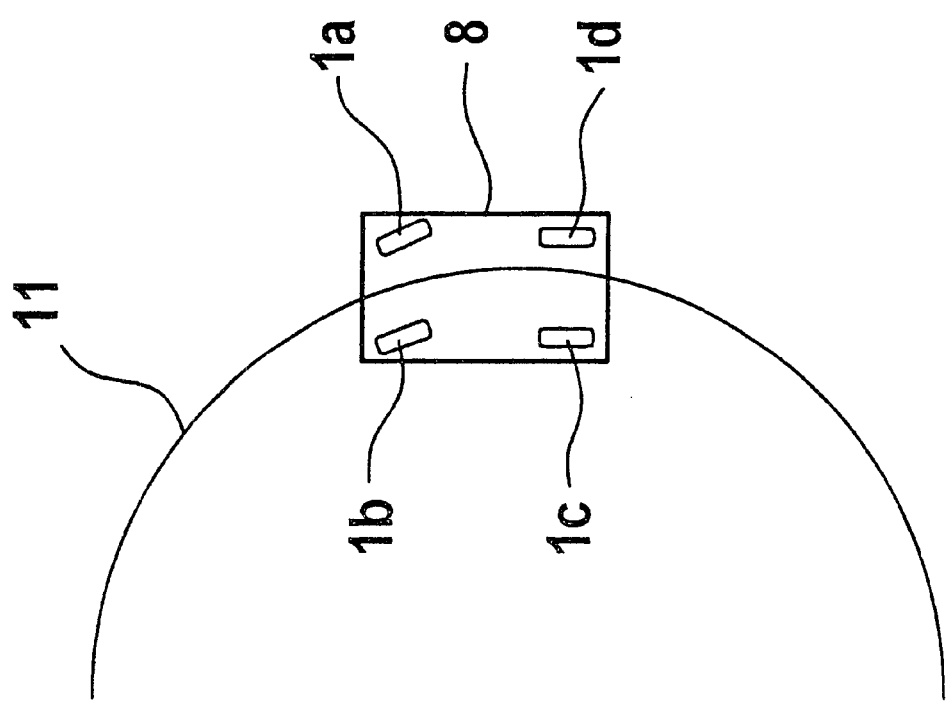

FIG. 3 illustrates three driving situations in a curve. Curve 11 in the left portion of FIG. 3 represents the path of a vehicle 8 that is braking in a turn in which a velocity and deceleration of the vehicle are low enough that no slippage of wheels occurs. The vehicle 8 is turning left in the figure and therefore, right front wheel 1 is the outside front wheel. Left front wheel 2 is the inside front wheel, right rear wheel 3 is the outside rear wheel and left rear wheel 4 is the inside rear wheel.

Curve 12 in the right portion of FIG. 3 represents the path of a vehicle 9 in an oversteering condition which is not being stabilized. Because of the weight distribution of the car and because either a velocity or a deceleration of the vehicle 9 exceeds a limit velocity or deceleration value for the vehicle, the wheels slip on the road surface. As illustrated the rear of the vehicle slides outwards more quickly than does the front of the vehicle.

Curve 13 of FIG. 3 represents the path of a vehicle 10 that experienced an oversteering condition that was recognized and compensated by a system according to the present invention. Specifically, once the oversteering condition of vehicle 10 was recognized by the ABS controller as described above, extra braking pressure was applied to the outside front wheel until the oversteering condition no longer existed. Overbraking the outside front wheel tends to stabilize the vehicle in a drifting or oversteering situation because the braking force on that wheel exerts a negative moment about the center axis of the vehicle to counteract the positive moment about the axis caused by the tendency of the rear of the vehicle to slide outwards.

By increasing the braking force at the outside front wheel, a counter-torque to the yaw moment is generated, where the yaw moment is the moment due to the vehicle self-steering plus the moment due to vehicle oversteering minus the moment due to the braking force on outside wheels.

At the same time, the transferrable lateral guiding force is reduced during an overbraking of the outside front wheel according to the principle of Kamm's circle and, consequently, the resulting moment due to self-steering as well. The overall yaw moment then decreases.

Recognizing an oversteering condition and compensating for that condition by overbraking the outside front wheel according to the present invention clearly reduces the oversteering behavior of the vehicle. In addition, the braking action and deceleration of the vehicle is improved. A further advantage of the present invention is that improves the feel of the brake pedal because a higher volume of brake fluid is caused to flow into the outside front wheel in such situations.

What is claimed is:

1. A method for controlling a braking system in a vehicle, the vehicle including an inside front wheel and an outside front wheel relative to a turning direction of the vehicle, characterized in that a determination is made of whether at least one of a drifting and an oversteering condition exists; and, if so, a predetermined braking pressure is applied to the outside front wheel; and characterized in that the at least one of the drifting and the oversteering condition is determined to exist when a transverse acceleration of the vehicle exceeds a predetermined transverse acceleration value.

2. A method for controlling a braking system in a vehicle, the vehicle including an inside front wheel and an outside front wheel relative to a turning direction of the vehicle, characterized in that a determination is made of whether at least one of a drifting and an oversteering condition exists; and, if so, a predetermined braking pressure is applied to the outside front wheel; and characterized in that the at least one of the drifting and the oversteering situation is determined to exist when a difference between a velocity of the inside front wheel a velocity of the outside front wheel exceeds a first predetermined velocity difference.

3. A method for controlling a braking system in a vehicle, the vehicle including an inside front wheel and an outside front wheel relative to a turning direction of the vehicle, characterized in that a determination is made of whether at least one of a drifting and an oversteering condition exists; and, if so, a predetermined braking pressure is applied to the outside front wheel; and characterized in that the vehicle further includes an inside rear wheel and an outside rear wheel, the at least one of the drifting and the oversteering situation being determined to exist when a difference between a velocity of the inside rear wheel and a velocity of the outside rear wheel exceeds a second predetermined velocity difference.

4. A method for controlling a braking system in a vehicle, the vehicle including an inside front wheel and an outside front wheel relative to a turning direction of the vehicle, characterized in that a determination is made of whether at least one of a drifting and an oversteering condition exists; and, if so, a predetermined braking pressure is applied to the outside front wheel; and characterized in that the at least one of the drifting and the oversteering situation is determined to exist when a velocity of the outside rear wheel exceeds a velocity of each of the remaining wheels by a predetermined amount.

5. A method for controlling a braking system in a vehicle, the vehicle including an inside front wheel and an outside front wheel relative to a turning direction of the vehicle, characterized in that a determination is made of whether at least one of a drifting and an oversteering condition exists; and, if so, a predetermined braking pressure is applied to the outside front wheel; and characterized in that the predetermined braking pressure is greater than a respective braking pressure on each of the remaining wheels of the vehicle.

6. A method for controlling a braking system in a vehicle, the vehicle including an inside front wheel and an outside front wheel relative to a turning direction of the vehicle, characterized in that a determination is made of whether at least one of a drifting and an oversteering condition exists; and, if so, a predetermined braking pressure is applied to the outside front wheel; and characterized in that the predetermined braking pressure corresponds to a driver-specifiable braking pressure.

7. An apparatus for controlling a braking system in a vehicle, the vehicle having an inside front wheel and an outside front wheel relative to a turning direction of the vehicle, characterized in that a control unit of the braking system is provided for determining whether at least one of a drifting and an oversteering condition exists, and, if so, for applying a predetermined braking pressure to the outside front wheel; and characterized in that the control unit determines the at least one of the drifting and the oversteering condition to exist when a transverse acceleration of the vehicle exceeds a predetermined transverse acceleration value.

8. An apparatus for controlling a braking system in a vehicle, the vehicle having an inside front wheel and an outside front wheel relative to a turning direction of the vehicle, characterized in that a control unit of the braking system is provided for determining whether at least one of a drifting and an oversteering condition exists, and, if so, for applying a predetermined braking pressure to the outside front wheel; and characterized in that the control unit determines the at least one of the drifting and the oversteering condition to exist when a difference between a velocity of the inside front wheel a velocity of the outside front wheel exceeds a first predetermined velocity difference.

9. An apparatus for controlling a braking system in a vehicle, the vehicle having an inside front wheel and an outside front wheel relative to a turning direction of the vehicle, characterized in that a control unit of the braking system is provided for determining whether at least one of a drifting and an oversteering condition exists, and, if so, for applying a predetermined braking pressure to the outside front wheel; and characterized in that the vehicle further includes an inside rear wheel and an outside rear wheel, and the control unit determines the at least one of the drifting and the oversteering condition to exist when a difference between a velocity of the inside rear wheel and a velocity of the outside rear wheel exceeds a second predetermined velocity difference.

10. An apparatus for controlling a braking system in a vehicle, the vehicle having an inside front wheel and an outside front wheel relative to a turning direction of the vehicle, characterized in that a control unit of the braking system is provided for determining whether at least one of a drifting and an oversteering condition exists, and, if so, for applying a predetermined braking pressure to the outside front wheel; and characterized in that the control unit determines the at least one of the drifting and the oversteering condition to exist when a velocity of the outside rear wheel exceeds a velocity of each of the remaining wheels.

11. An apparatus for controlling a braking system in a vehicle, the vehicle having an inside front wheel and an outside front wheel relative to a turning direction of the vehicle, characterized in that a control unit of the braking system is provided for determining whether at least one of a drifting and an oversteering condition exists, and, if so, for applying a predetermined braking pressure to the outside front wheel; and characterized in that the predetermined braking pressure is greater than a respective braking pressure on remaining wheels of the vehicle.

12. An apparatus for controlling a braking system in a vehicle, the vehicle having an inside front wheel and an outside front wheel relative to a turning direction of the vehicle, characterized in that a control unit of the braking system is provided for determining whether at least one of a drifting and an oversteering condition exists, and, if so, for applying a predetermined braking pressure to the outside front wheel; and characterized in that the predetermined braking pressure corresponds to a driver-specifiable braking pressure.

* * * * *